United States Patent
Zavesky et al.

(10) Patent No.: US 9,949,138 B2
(45) Date of Patent: Apr. 17, 2018

(54) SYSTEMS AND METHODS TO AUGMENT THE CAPACITIES AND CAPABILITIES OF CELLULAR NETWORKS THROUGH AN UNMANNED AERIAL VEHICLE NETWORK OVERLAY

(71) Applicant: AT&T Intellectual Property I, L.P., Atlanta, GA (US)

(72) Inventors: Eric Zavesky, Austin, TX (US); Jason Decuir, Cedar Park, TX (US); Robert Gratz, Lockhart, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/222,014

(22) Filed: Jul. 28, 2016

(65) Prior Publication Data

US 2018/0035306 A1    Feb. 1, 2018

(51) Int. Cl.
*H04B 7/185* (2006.01)
*H04W 16/18* (2009.01)
*H04W 84/04* (2009.01)

(52) U.S. Cl.
CPC ........ *H04W 16/18* (2013.01); *H04B 7/18506* (2013.01); *H04W 84/042* (2013.01)

(58) Field of Classification Search
CPC ............ H04B 7/18506; H04B 7/18504; H04B 1/0483; H04B 7/18508; H04W 84/18; H04W 88/16; H04W 88/04; H04W 52/46
USPC ......... 455/431, 11.1–13.1; 370/15, 316, 492, 370/501; 709/315, 316, 492, 501
See application file for complete search history.

(56) References Cited

U.S. PATENT DOCUMENTS

| | | | |
|---|---|---|---|
| 9,300,388 B1 | 3/2016 | Behroozi et al. | |
| 2013/0303218 A1 | 11/2013 | Teller et al. | |
| 2015/0236778 A1 | 8/2015 | Jalali | |
| 2015/0270897 A1* | 9/2015 | Sackman | H04B 10/118 398/125 |
| 2015/0327136 A1 | 11/2015 | Kim et al. | |

(Continued)

FOREIGN PATENT DOCUMENTS

| | | |
|---|---|---|
| CN | 104517432 A | 4/2015 |
| EP | 2978258 A1 | 1/2016 |

(Continued)

OTHER PUBLICATIONS

Lay Gupta et al. "Survey of Important Issues in UAV Communication Networks", Nov. 3, 2015, Published in: IEEE Communications Surveys & Tutorials (vol. 18, Issue: 2, Secondquarter 2016), pp. 1-32.*

(Continued)

*Primary Examiner* — Allahyar Kasraian
(74) *Attorney, Agent, or Firm* — Baker & Hostetler LLP

(57) ABSTRACT

A system includes a wireless network and a software defined network overlaid over the wireless network. The software defined network includes at least one UAV having a software defined network device and a bridging radio component. The system includes a communication component in communication with the bridging radio component and a controller connected to the software defined network that makes routing decisions and communicates the routing decisions to the software defined network device.

20 Claims, 3 Drawing Sheets

(56) References Cited

U.S. PATENT DOCUMENTS

| | | | |
|---|---|---|---|
| 2016/0028471 A1* | 1/2016 | Boss | H04W 84/06 455/406 |
| 2016/0285864 A1* | 9/2016 | Canavor | H04L 63/0823 |
| 2016/0315785 A1* | 10/2016 | Dronadula | H04L 12/4633 |

FOREIGN PATENT DOCUMENTS

| | | | | |
|---|---|---|---|---|
| KR | 1020150139927 | * | 9/2016 | H04W 84/06 |
| WO | WO 2015/139733 A1 | | 9/2015 | |

OTHER PUBLICATIONS

Churchill; "Flying Cell Towers"; http://www.dailywireless.org/2012/03/06/flying-cell-towers/; Daily Wireless Newsletter; Mar. 6, 2012; 7 pages.

Ackerman; Boeing Bill Its Massive Hydrogen-Powered Drone as a Flying Cell Tower; http://www.wired.com/2013/04/phantom-eye-2/; Wired; Apr. 8, 2013; 5 pages.

* cited by examiner

SYSTEMS AND METHODS TO AUGMENT THE CAPACITIES AND CAPABILITIES OF CELLULAR NETWORKS THROUGH AN UNMANNED AERIAL VEHICLE NETWORK OVERLAY

TECHNICAL FIELD

The present invention relates generally systems and methods for expanding the capacity of cellular networks, and specifically to the use of telecommunications-equipped unmanned aerial vehicles (UAVs) to augment the capacities and capabilities of cellular networks by creating a UAV network overlay.

BACKGROUND

Ubiquitous connectivity is increasingly the norm as mobile communication and connected devices continue to grow in use. Telecommunication carriers are adapting to these connectivity requirements by pursing new principles for software-defined networking (SDN). However, these technologies are still bound by software, so real-world physical challenges like RF coverage, accessibility of location, and back-haul bandwidth still need to be addressed. In unexpected or emergency-based outages, no preexisting terrestrial network technologies have functional guarantees. Additionally, as the need to host high-bandwidth and high-computation nodes on the edge grow (e.g. video conferences, 3d camera streaming, etc.) existing edge nodes may be saturated before they can honor all user needs.

There is a need to provide quick deployment of connectivity to new locations using the existing infrastructure. There is also a need to bridge traditional Universal Mobile Telecommunications System (UMTS), Long-Term Evolution (LTE), Satellite, short-wave, etc. radios though a proxy.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

DETAILED DESCRIPTION OF ILLUSTRATIVE EMBODIMENTS

Figure 1:
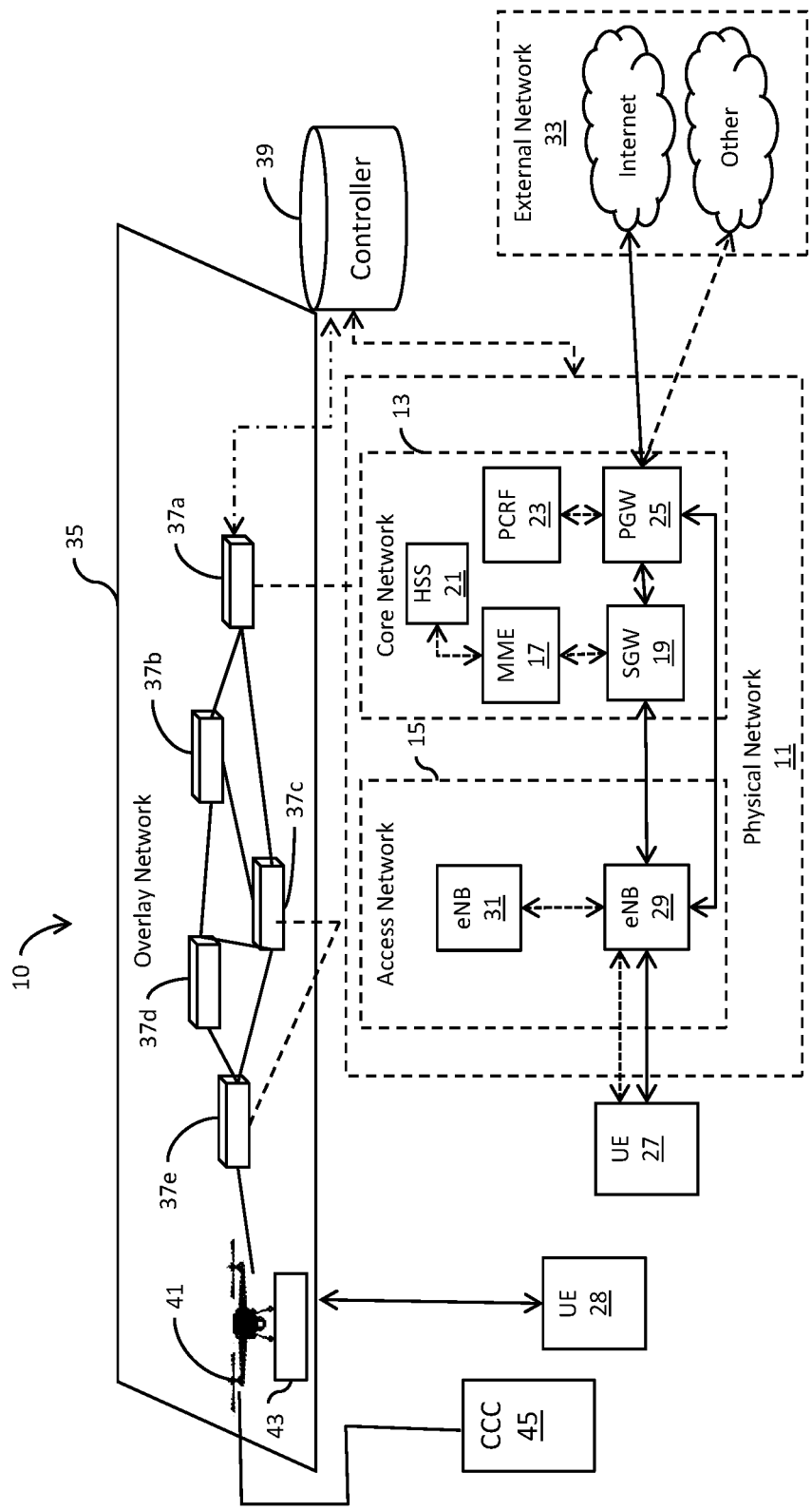
FIG. 1 is a block diagram of a UAV overlay System.

Illustrated in FIG. 1 is a block diagram of a UAV overlay system 10. The UAV overlay system 10 includes a wireless physical network 11, which may include a core network 13 and an access network 15. In an embodiment the wireless physical network 11 may be a wireless local area network (WLAN) using mobile telecommunication cellular network technologies such as LTE, WiMAX (often called a wireless metropolitan area network or WMAN), UMTS, CDMA2000, GSM, cellular digital packet data (CDPD) and Mobitex to transfer data.

In one embodiment, the core network 13 includes various network entities, such as a mobility management entity (MME 17), SGW 19, Home Subscriber Server (HSS) 21, Policy and Charging Rules Function (PCRF) 23 and packet data network gateway (PGW 25). In one embodiment, MME 17 comprises a control node performing control signaling between various equipment and devices in access network 15 and core network 13. The protocols running between user equipment (UE 27) and core network 13 are generally known as non-access stratum (NAS) protocols.

For illustration purposes only, MME 17, SGW 19, HSS 21 and PGW 25, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

Access network 15 may include an LTE network architecture sometimes referred to as evolved universal mobile telecommunication system Terrestrial Radio Access (E UTRA) and evolved UMTS terrestrial radio access network (E-UTRAN). Broadly, access network 15 may include one or more wireless access nodes, such as a base station, or in one embodiment an evolved Node B (e-NodeB) for example, e-NodeB 29, and e-NodeB 31. During network operations, at least one e-NodeB (e.g. e-NodeB 29) may communicate directly with UE 27 over the air and wirelessly. UE 27 may connect to e-NodeB 31 when UE 27 is within range according to a corresponding wireless communication technology.

UE 27 is a device that accesses a service on the network. UE 27 may include devices like smart phone handsets, tablet computers, wearable network devices, laptop and desktop computers, set top entertainment boxes and game consoles, vending machines, consumer and industrial robots, environmental sensors, Internet connected vehicles, and the like.

According to traditional implementations of LTE-EPS architectures, SGW 19 routes and forwards all user data packets. SGW 19 also acts as a mobility anchor for user plane operation during handovers between base stations, e.g., during a handover from e-NodeB 29 to second e-Node B 31 as may be the result of UE 27 moving from one area of coverage (e.g., cell) to another. SGW 19 can also terminate a downlink data path, e.g., from external network 33 to UE 27 in an idle state, and trigger a paging operation when downlink data arrives for UE 27. SGW 19 can also be configured to manage and store a context for UE 27, e.g., including one or more of parameters of the IP bearer service and network internal routing information. In addition, SGW 19 can perform administrative functions, e.g., in a visited network, such as collecting information for charging (e.g., the volume of data sent to or received from the user), and/or replicate user traffic, e.g., to support a lawful interception. SGW 19 also serves as the mobility anchor for interworking with other 3GPP technologies such as UMTS.

At any given time, UE 27 is generally in one of three different states: detached, idle, or active. The detached state is typically a transitory state in which UE 27 is powered on but is engaged in a process of searching and registering with access network 15. In the active state, UE 27 is registered with access network 15 and has established a wireless connection, e.g., radio resource control (RRC) connection, with e-NodeB 29. Whether UE 27 is in an active state can depend on the state of a packet data session, and whether there is an active packet data session. In the idle state, UE 27 is generally in a power conservation state in which UE 27 typically does not communicate packets. When UE 27 is idle, SGW 19 can terminate a downlink data path, e.g., from one peer entity in external network 33, and triggers paging of UE 27 when data arrives for UE 27. If UE 27 responds to the page, SGW 19 can forward the IP packet to e-Node B 29.

HSS 21 may manage subscription-related information for a user of UE 27. For example, HSS 21 can store information such as authorization of the user, security requirements for the user, quality of service (QoS) requirements for the user, etc. HSS 21 can also hold information about external network 33 to which the user can connect, e.g., in the form of an APN of external network 33. For example, MME 17 can communicate with HSS 21 to determine if UE 27 is authorized to establish a call, e.g., a voice over IP (VoIP) call before the call is established.

PCRF 23 may perform QoS management functions and policy control. PCRF 23 is responsible for policy control decision-making, as well as for controlling the flow-based charging functionalities in a policy control enforcement function (PCEF), which resides in PGW 25. PCRF 23 provides the QoS authorization, e.g., QoS class identifier and bit rates that decide how a certain data flow will be treated in the PCEF and ensures that this is in accordance with the user's subscription profile.

PGW 25 may provide connectivity between the UE 27 and one or more of the external network 33. In wireless physical network 11, PGW 25 can be responsible for IP address allocation for UE 27, as well as one or more of QoS enforcement and flow-based charging, e.g., according to rules from the PCRF 23. PGW 25 is also typically responsible for filtering downlink user IP packets into the different QoS-based bearers. In at least some embodiments, such filtering can be performed based on traffic flow templates. PGW 25 can also perform QoS enforcement, e.g., for guaranteed bit rate bearers. PGW 25 also serves as a mobility anchor for interworking with non-3GPP technologies such as CDMA2000.

UAV overlay system 10 also includes an overlay network 35 which in one embodiment may be a software defined network. A software defined network is a computer networking architecture where the data plane is separated from the control plane in routers and switches. In other words, the control is decoupled from hardware and implemented in software. An overlay network is a computer or storage network built on top of another network and connected by virtual or logical links. In the context of software-defined networks, an overlay network uses virtual links to connect to the underlying physical network. The overlay network 35 uses software virtualization to create additional layers of network abstraction (or software-based network overlays) that can be run on top of the wireless physical network 11, often providing new applications or security benefits. Under this architecture, the implementation of the control plane is via software within the servers and is separate from networking equipment, while the data plane is implemented within networking hardware or equipment. Elements within the data plane continue to interoperate through the control layer, so any routing or flow control is agnostic of the data plane source or destination. This is one of the strongest benefits of a software defined network, which is fully leveraged when connecting data planes across one or more servers and one or more low-level communication protocols implemented via different physical network devices.

In another embodiment, all parts of the network including the UAV overlay system 10, the wireless physical network 11 (the application plane, the control plane, and the data plane), and a software defined network controller (SDN controller 39) may be hosted on UAV overlay network 35. In this topology, infrastructure including the access network 15 and core network 13 wholly resides on the UAV network 35 itself. Following the previous paragraph's described methods, yet another embodiment may exists where elements on this UAV network may also be deployed using SDN disciplines such that virtual network functions are utilized to create software-controlled application, control, and data plane layers. Both embodiments (one using SDN and not using SDN) demonstrate examples where an entire communication network could be locally constructed on a UAV overlay system 10 and provide similar service for UE 27 devices.

The overlay network 35 includes a plurality of nodes characterized by software defined network devices 37a-e. Software defined network devices 37a-e may include content servers, routers, switches and gateways. A Virtual Router, or vRouter, is a software function that replicates in software the functionality of a hardware-based Layer 3 Internet Protocol (IP) routing, which has traditionally used a dedicated hardware device. It is often used as a generic term for virtual routing, but it is also included in the name of several brand-name commercial products. Virtual routing is a form of Network Functions Virtualization (NFV), in which the functions of traditional hardware-based network appliances are converted to software than can be run on standard Commercial Off-the-Shelf (COTS) hardware. This has advantages of lowering hardware costs and allowing more hardware interoperability, rather than requiring a proprietary hardware platform. Similar to above the utilization of a software defined network abstracts away specific hardware definitions and allows the operator to perform routing and server actions on arbitrary software.

Associated with the overlay network 35 is an SDN controller 39. The SDN controller 39 makes routing decisions and communicates the routing decisions to the software defined network devices 37a-e. The SDN controller 39 is a logically centralized entity in charge of (i) translating the requirements from an SDN application layer down to the SDN data paths and (ii) providing SDN applications with an abstract view of the network (which may include statistics and events). The SDN controller 39 is the core of an SDN network. The SDN controller 39 lies between network devices at one end and applications at the other end. Any communications between applications and software defined network devices 37a—e have to go through the SDN controller 39. The SDN controller 39 also uses protocols such as OpenFlow to configure network devices and choose the optimal network path for application traffic. In effect, the SDN controller 39 acts as an operating system for the network. The SDN controller 39 takes the control plane off the network hardware and runs it as software instead. The SDN controller 39 facilitates automated network management and makes it easier to integrate and administer business applications.

The UAV overlay system 10 also includes one or more UAV 41 which carry an SDN device (not shown) e.g. a router or switch and operates as one of the nodes in the overlay network 35. An SDN device is any device that satisfies the requirements to function in an SDN model. The SDN device should support an application programming interface ("API") for communication with the controller, an abstraction layer for traffic programming, and a packet-processing function to perform data forwarding. The SDN device is another programmable node in the overlay network 35.

UAV 41 may also carry a bridging radio component 43 which provides bridging radio functionality. Network bridging is the action taken by network equipment to create an aggregate network from either two or more communication networks, or two or more network segments. Bridging radio component 43 allows the bridging of traditional UMTS, LTE, satellite communication or a shortwave communication component through a UAV proxy. In one embodiment, one or more radio components 43 (each for an individual protocol and radio frequency) allows the UAV to receive data from an external network 33 on one radio channel and echo that data onto another radio channel that connects to another network. For example, data traffic that traditionally relies on LTE or UMTS radios can be redirected over satellite or shortwave radios. UAV 41 provides a geo-spatially precise node to host the bridge. With bridging radio component 43 and an SDN configuration a UAV node could be dispatched to service a location with poor terrestrial connectivity (e.g. very rural) but having high shortwave or satellite RF availability to augment existing connectivity. Similarly in a highly rural environment, one or more UAV 41 could be deployed to temporarily replace existing connectivity (e.g. UMTS, LTE, etc.) during severe equipment failure or during an unexpected, localized spike of service demand.

The UAV overlay system 10 may also include a command and control center 45 that controls the UAV 41. The command and control center is typically a facility that operates as the operating entity's dispatch center, surveillance monitoring center, coordination office and alarm monitoring center all in one. Command and control centers are operated by the operating entity.

Overlay network 35 may be accessed by UE 28 by accessing the bridging radio component 43 on the UAV 41. In one embodiment, the bridging radio component 43 duplicates functionality offered by physical network 11 such as core network 13 and access network 15 components. Specifically, one or more UAV 41 elements in the overlay network 35 may function as eNodeB 31 that are available only connected to other eNodeBs 29. In another embodiment, one or more UAV 41 elements may act as eNodeBs 29 that access both UEs 27, eNodeBs 31, and SGW 19 and PGW 25. In both embodiments, UAV 41 elements replace or augment the capacity of the physical network 11 by taking on roles of elements that were previously terrestrial or fixed.

Figure 2:
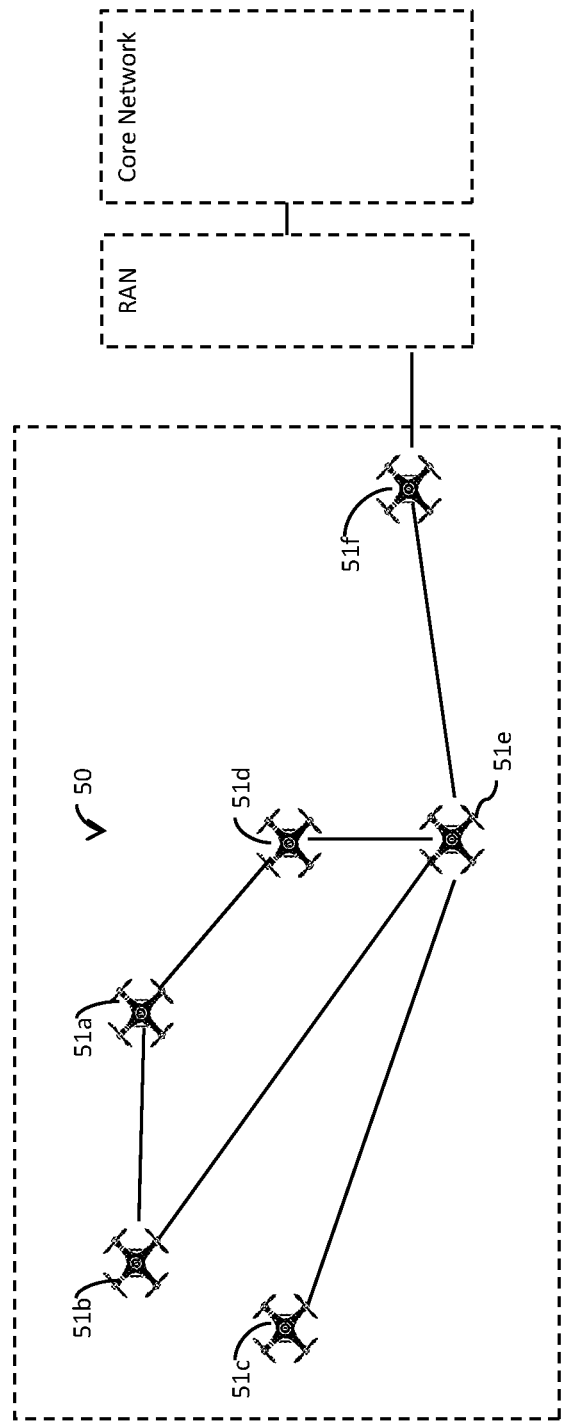
FIG. 2 illustrates a UAV mesh network according to an embodiment.

FIG. 2 illustrates a UAV mesh network 50 according to an embodiment. The UAV mesh network 50 includes UAVs 51a-f which are configured to communicate with one another. UAVs 51a-f function as a wireless mesh network for network communications purposes. A wireless mesh network is any wireless network where data is transmitted using mesh networking, where nodes send and receive data, and also serve as a relay for other nodes and each node collaborates in propagating data on the UAV mesh network 50. In a mesh infrastructure data is carried over large distances by splitting the distance into a series of short hops. Intermediate nodes boost the signal, and pass data from one node to another. Similar to the way packets travel around the wired Internet, in a mesh network data will hop from device to device until the data reaches its destination. Routing is accomplished with dynamic routing algorithms implemented in each device. Each device communicates routing information to other devices in the network and then determines whether to pass it on to the next device or keep it, depending on the protocol. The routing algorithm used should attempt to always ensure that the data takes the most appropriate (fastest) route to its destination. Mesh network architecture provides high bandwidth, spectral efficiency, and economic advantage over the coverage area. Wireless mesh networks have a relatively stable topology except for the occasional failure of nodes or addition of new nodes.

The UAV overlay system 10 allows for the bridging of traditional UMTS, LTE, Satellite, short-wave, etc. radios though a UAV proxy. The UAV overlay system 10 provides geo-spatially precise UAV nodes to host the bridge. With the appropriate radios and a software defined network configuration a UAV 41 could be dispatched to service a location with poor terrestrial connectivity (e.g. very rural) but high short-wave or satellite RF availability to augment existing connectivity to act as a node in the overlay network 35. Similarly, in a highly rural environment, UAV 41 (or a plurality of UAVs) may be deployed to temporarily replace existing connectivity (e.g. UMTS, LTE, etc.) during severe equipment failure or during an unexpected, localized spike of service demand.

The UAV overlay system 10 may be used to facilitate fast emergency response for damaged network nodes (e.g. damaged radio tower). In that case the UAV 41 would fly to the precise tower location to assume responsibility of the tower and its radio functions.

The UAV overlay system 10 may be used to provide "service on demand." A UAV 41 may be flown to any location and with any set of computing resources (storage, multiple local compute nodes, etc.) to service a demand.

The UAV overlay system 10 may provide service payload distribution that supports edge services that require more computing or bandwidth resources than are currently available. Instead of pushing a resource-heavy task (3D live streaming or many-party video conferencing at a convention center) onto the back-haul network and distributed computing clusters, a UAV 41 may be deployed to act in either role. Following software defined network guidelines, the UAV 41 becomes another programmable node in the network. While a central command and control center 45 may control the navigational and allocation functions of the UAV 41, it could have on-board local computing, local storage, and utilize a secondary radio to overlay multiple networks. In addition to reduced requirements on the back-haul, a UAV 41 that is locally deployed would easily accommodate any large scale service on demand with negligible latency—leading to cost reductions for the network provider and the consumer (not having to lug or lease additional cloud resources). UAV 41 also may be adapted to locally augment a tower's backhaul by using a network overlay. The UAV 41 would fly to a tower, turn on a satellite radio receiver, and allow rebroadcast of content at local tower where the appropriate radio did not exist.

UAV 41 may be physically modified to not only offer software defined network capabilities, but also carry physical components to repair faulty terrestrial resources: UAVs could carry batteries, additional radios, or fiber microprocessors to remote areas that could be "dropped in" to augment and upgrade the capabilities of a tower.

With bridging radio component 43 acting as a software defined network component, hosting of any service could be enhanced even in high-density areas (an urban location) with low latency. A service that follows a user, for example a parade needing streaming services may be provided.

In environments where a small company or group of individuals needs a network for high security activity (e.g. military action in a foreign country), a UAV deployed local network may provide a secure solution. A UAV deployed local network would avoid back-haul transmission of content between connected users (between one or more UAV nodes), and also enforce a geospatial limit on the communication radius (coverage of radios), which can be updated to follow one or more users dynamically. A plurality of UAVs forming a mesh network may provide a high security environments (or AB testing of network technologies) that may be quickly configured and deployed.

Cross-radio proxies are still unused (because few other communication companies own rights for both spectrum) and this is a novel way to truly deploy and utilize the most of both assets. As mentioned in previous paragraphs, one or more external networks 33 can be proxied with the overlay network 35. One embodiment provides greater capacity and throughput by distributing data needs the different networks themselves (e.g. satellite and LTE). Another embodiment extends the range and capacity of a particular radio channel by locally repeating data. Here the overlay network 35 emulates a satellite external network 33 in underground or indoor areas using satellite-based bridging radio component 43 by proxying data requests to an LTE bridging radio component 43 and its external network 33 such that attached UE 28 using satellite radios have a functioning service where there was none before.

Figure 3:
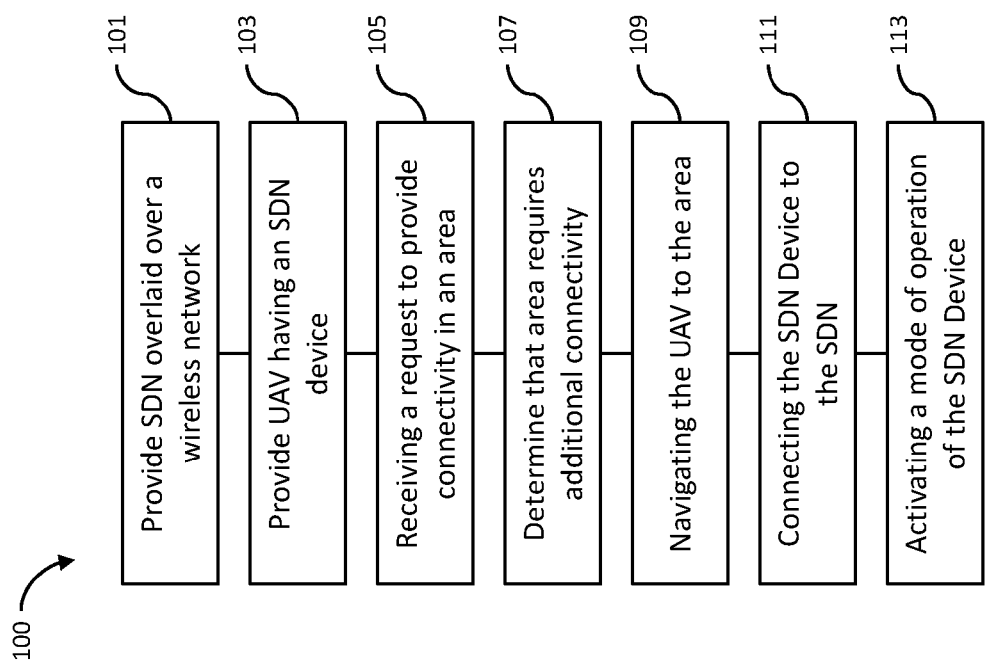
FIG. 3 is a flowchart illustrating an embodiment of a method for augmenting the capacities and capabilities of a cellular network through the use of an unmanned aerial vehicle.

FIG. 3 illustrates an embodiment of a method to augment the capacities and capabilities of a cellular network through the use of an unmanned aerial vehicle networked overlay.

In step 101, a software defined network 35 overlaid over a wireless physical network 11 is provided. The software defined network 35 includes a software defined network controller 39. The software defined network 35 is connected to the wireless physical network 11

In step 103, a UAV 41 having an SDN device 43 is provided.

In step 105, the wireless physical network 11 receives a request to provide connectivity to an area.

In step 107, a system in the wireless physical network 11 determines that the area requires connectivity. The determination may be made by analyzing the request to provide connectivity, existing connectivity in the area, network traffic in the area, anticipated increase in demand for network services in the area, and the like. Anticipated increase in demand may result from the need for more capacity for weather, disasters, partial signal loss in the area due to time of day or unexpected traffic, or the perceived glitch from a new client detected elsewhere in the network but expected to effect the UAV's target zone. Connectivity determination may also be based on a customer request for a private/secure network (similar to increase in demand, but all services must be replicated for private channels). Additional connectivity may also be the result of the need for additional local compute or storage capacity (e.g. ultra-low latency for high-bandwidth video, as required by a conference broadcast or future telemedicine applications). Other connectivity demand may be required for handoff or replacement of current connectivity (e.g. a test cycle for new software or hardware versions or known equipment failure where other non-UAV nodes cannot be created quickly enough); and preventing or starting a network-based countermeasures on resources where the UAV nodes will begin broadcasting or intercepting connectivity from other networks.

In step 109, the UAV 41 is navigated to the area through the use of a command and control center 45.

In step 111, the SDN device 43 is connected to the software defined network 35.

In step 113, a mode of operation of the SDN device 43 is activated through the software defined network controller 39. Examples of modes of operation of the SDN device 43 include operating as a relay/proxy, augmenting existing software defined network resources, providing a self-contained local service and new configurations (e.g. topology, routing), and software, or hardware radios.

The foregoing detailed description is to be understood as being in every respect illustrative and exemplary, but not restrictive, and the scope of the invention disclosed herein is not to be determined from the detailed description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, in addition to the masking of certain frequency channels as described above, it is also possible to initiate data transmission on alternate frequency channels upon a determination that certain frequency channels need to be masked. Further, one skilled in the art would recognize that various combinations of embodiments are also possible in accordance with the principles of the present disclosure.

What is claimed:

1. A system comprising:
    a physical wireless network;
    an overlay network comprising a software defined network overlaid over the physical wireless network and connected to the physical wireless network though virtual links;
    one or more unmanned aerial vehicles each having a software defined network device, a bridging radio component and an element that functions as an eNodeB capable of accessing a user equipment;
    a communication component in communication with each bridging radio component;
    a software defined network controller connected to the software defined network and each software defined network device, wherein the software defined network controller makes routing decisions and communicates the routing decisions to the software defined network device; and
    wherein the software defined network device and the bridging radio component support an Application Programming Interface (API) for communication with the software defined network controller, an abstraction layer for traffic programming and a packet-processing function to perform data forwarding.

2. The system of claim 1 wherein the communication component is one selected from among a group comprising a universal mobile telecommunications system component, a long term evolution component, a satellite communication component; or a short-wave communication component.

3. The system of claim 1 wherein the one or more unmanned aerial vehicles comprise a plurality of unmanned aerial vehicles, each having a software defined network device and a bridging radio component.

4. The system of claim 1 wherein the software defined network device comprises one selected from among a group comprising routers, switches, virtual switches, wireless access points.

5. The system of claim 3 wherein the plurality of unmanned aerial vehicle are disposed as a mesh network.

6. The system of claim 1 wherein the one or more unmanned aerial vehicles are controlled by a command and control center.

7. The system of claim 6 wherein the one or more unmanned aerial vehicles further comprise a global positioning system that can be accessed by the command and control center.

8. A method for providing wireless connectivity in an area comprising:
providing an overlay network overlaid over a wireless physical network wherein the overlay network comprises a software defined network and a software defined network controller;
determining, in a system in the wireless physical network, that the area requires wireless connectivity;
providing an unmanned aerial vehicle having a software defined network device in communication with the software defined network controller, a bridging radio component, and an element that functions as an eNodeB capable of communicating with a user equipment;
navigating the unmanned aerial vehicle to the area using a command and control center;
connecting the software defined network device to the software defined network through the software defined network controller;
communicating through the bridging radio component with the software defined network controller using an Application Programming Interface (API);
programming traffic through the bridging radio component using an abstraction layer;
forwarding data through the bridging radio component using a packet processing function; and
communicating through the element that functions as an eNodeB with the user equipment.

9. The method of claim 8 further comprising receiving a request to provide connectivity in the area.

10. The method of claim 8 wherein the navigating the unmanned aerial vehicle to the area comprises the unmanned aerial vehicle self-navigating to the area.

11. The method of claim 8 further comprising activating a mode of operation of the software defined network device.

12. The method of claim 11 wherein the mode of operation is as a relay/proxy.

13. The method of claim 11 wherein the mode of operation is to augment existing software defined network resources.

14. The method of claim 11 wherein the mode of operation is to provide a self-contained local service.

15. A network comprising:
a physical wireless network;
an overlay network comprising a software defined network overlaid over the physical wireless network, wherein the software defined network comprises a communication component;
a plurality of unmanned aerial vehicles; and
a plurality of software defined network devices wherein at least one of the plurality of software defined network devices is disposed on each of the plurality of unmanned aerial vehicles and wherein one or more of the plurality of software defined network devices is in communication with the communication component and wherein each of the plurality of software defined network devices is in communication with at least another one of the plurality of software defined network devices;
wherein the plurality of software defined network devices support an Application Programming Interface (API) for communication with a software defined network controller, an abstraction layer for traffic programming and a packet-processing function to perform data forwarding;
a plurality of elements that function as an eNodeB capable of accessing a user equipment wherein at least one of the plurality of elements is disposed in each of the plurality of unmanned aerial vehicles; and
a routing algorithm that communicates routing information between the plurality of software defined network devices.

16. The network of claim 15 wherein each of the plurality of software defined network devices is a proxy for a cellular system.

17. The network of claim 15 further comprising a controller that makes routing decisions and communicates the routing decisions to one or more of the plurality of software defined network devices and the communication component.

18. The network of claim 15 wherein at least one of the plurality of software defined network devices provides data storage.

19. The network of claim 15 wherein the plurality of software defined network devices provide multiple local compute nodes for the wireless network.

20. The network of claim 15 further comprising at least one physical component carried by the unmanned aerial vehicle.

* * * * *